US011682394B2

(12) United States Patent
Namm et al.

(10) Patent No.: US 11,682,394 B2
(45) Date of Patent: Jun. 20, 2023

(54) DEVICE OPERATION WHEN A USER DOES NOT ANSWER A CALL

(71) Applicant: MOTOROLA SOLUTIONS, INC., Chicago, IL (US)

(72) Inventors: Joseph Namm, Plantation, FL (US); Emily Namm, Plantation, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 41 days.

(21) Appl. No.: 17/120,306

(22) Filed: Dec. 14, 2020

(65) Prior Publication Data

US 2022/0189473 A1 Jun. 16, 2022

(51) Int. Cl.
*G10L 15/22* (2006.01)
*G10L 15/08* (2006.01)

(52) U.S. Cl.
CPC ............... *G10L 15/22* (2013.01); *G10L 15/08* (2013.01); *G10L 2015/088* (2013.01)

(58) Field of Classification Search
CPC ....... G10L 15/22; G10L 15/00; G10L 15/063; G10L 15/08; G10L 15/088; G10L 15/30; G10L 2015/0631–0638; G10L 2015/221–228

USPC .... 704/704, 273, 270.1, 270, 274, 275, 243, 704/244, 245, 250, 255
See application file for complete search history.

(56) References Cited

U.S. PATENT DOCUMENTS

| 9,137,645 B2 | 9/2015 | Namm et al. |
| 10,255,792 B2* | 4/2019 | Farrand ................. G08B 25/00 |
| 10,460,227 B2 | 10/2019 | Sanghavi et al. |
| 2005/0282518 A1* | 12/2005 | D'Evelyn .............. H04M 11/04 455/404.1 |
| 2013/0324095 A1* | 12/2013 | Namm .................. H04L 65/403 455/416 |
| 2015/0074524 A1 | 3/2015 | Nicholson et al. |

* cited by examiner

*Primary Examiner* — Qi Han (57) ABSTRACT

A method and apparatus for operating a device when a user does not answer a call is provided herein. During operation a wake word for the device is identified as a user's call sign (a combination of identifying letters, letters and numbers, or words assigned to an officer for use in communication (as in the address of a message sent by radio). The call sign does not comprise a sender or receiver's actual name. When a device detects the wake word as an over-the-air transmission, the device will determine if a user answered the call. If not, sensor data will be provided to the caller and a digital assistant will periodically remind the user of the unanswered call.

9 Claims, 4 Drawing Sheets

DEVICE OPERATION WHEN A USER DOES NOT ANSWER A CALL

BACKGROUND OF THE INVENTION

Many police radios comprise, or provide access to, electronic digital assistants (or sometimes referenced as "virtual partners") that may provide the user thereof with valuable information in an automated (e.g., without further user input) and/or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, instructing users how to proceed with an assigned task, warning users of nearby dangers such as traffic accidents or environmental hazards, and providing many other types of information in a reactive or proactive manner.

While executing their duties, a police officer may become distracted, busy, or physically compromised. The police officer may not be able to promptly respond to a call or other transmission directed to them. It would be beneficial to leverage a digital assistant to improve device operation when the user does not answer a call.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for operating a device when a user does not answer a call is provided herein. During operation a wake word for the device is identified as a user's call sign (a combination of identifying letters, letters and numbers, or words assigned to an officer for use in communication (as in the address of a message sent by radio). The call sign does not comprise a sender or receiver's actual name. When a device detects the wake word as an over-the-air transmission, the device will determine if a user answered the call. If not, sensor data will be provided to the caller and a digital assistant will periodically remind the user of the unanswered call.

Expanding on the above, assume that Officer Fred is operating a radio, and that Officer Fred is identified by the call sign "Sam 6". Officer Fred's radio will be configured with a digital assistant that "wakes" upon receiving an over-the-air transmission of voice calling for "Sam 6". If Officer Fred does not answer the call within a predetermined amount of time, the digital assistant will periodically remind Officer Fred of the missed call. In addition, the radio will be triggered to provide sensor data to the caller when Officer Fred does not answer the call.

Figure 1:
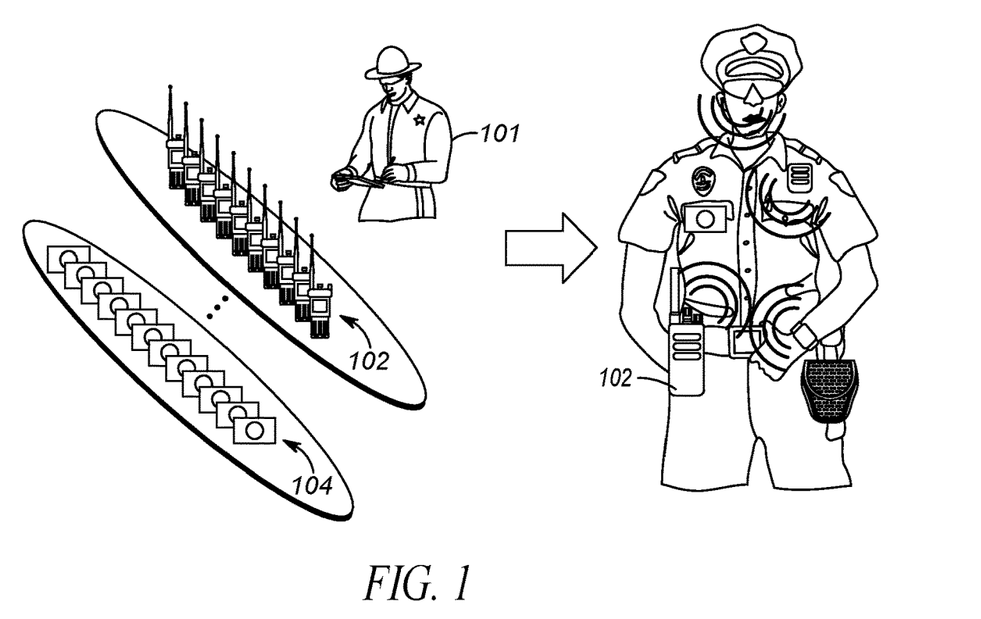
FIG. 1 illustrates an operational environment for the present invention.

Turning now to the drawings, wherein like numerals designate like components, FIG. 1 illustrates an operational environment for the present invention. As shown, a public safety officer 101 will be equipped with devices that determine various physical and environmental conditions surrounding the public-safety officer. These conditions may be reported back to, for example, a dispatch center so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer will select the devices off the shelf, and form a personal area network (PAN) with the devices that will accompany the officer on their shift. For example, the officer may pull a gun-draw sensor, a body-worn camera, a wireless microphone, a smart watch, a police radio, smart handcuffs, a man-down sensor, a bio-sensor, . . . , etc. All devices pulled by the officer will be configured to form a PAN by associating (pairing) with each other and communicating wirelessly among the devices. At least one device may be configured with a digital assistant.

In a preferred embodiment, the PAN comprises more than two devices, so that many devices may be connected via the PAN simultaneously.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 1, public-safety officer 101 has an array of devices to use during the officer's shift. For example, the officer may pull one radio 102 and one camera 104 for use during their shift. Other devices may be pulled as well. As shown in FIG. 1, officer 101 will preferably wear the devices during a shift by attaching the devices to clothing. These devices will form a PAN throughout the officer's shift.

Figure 2:
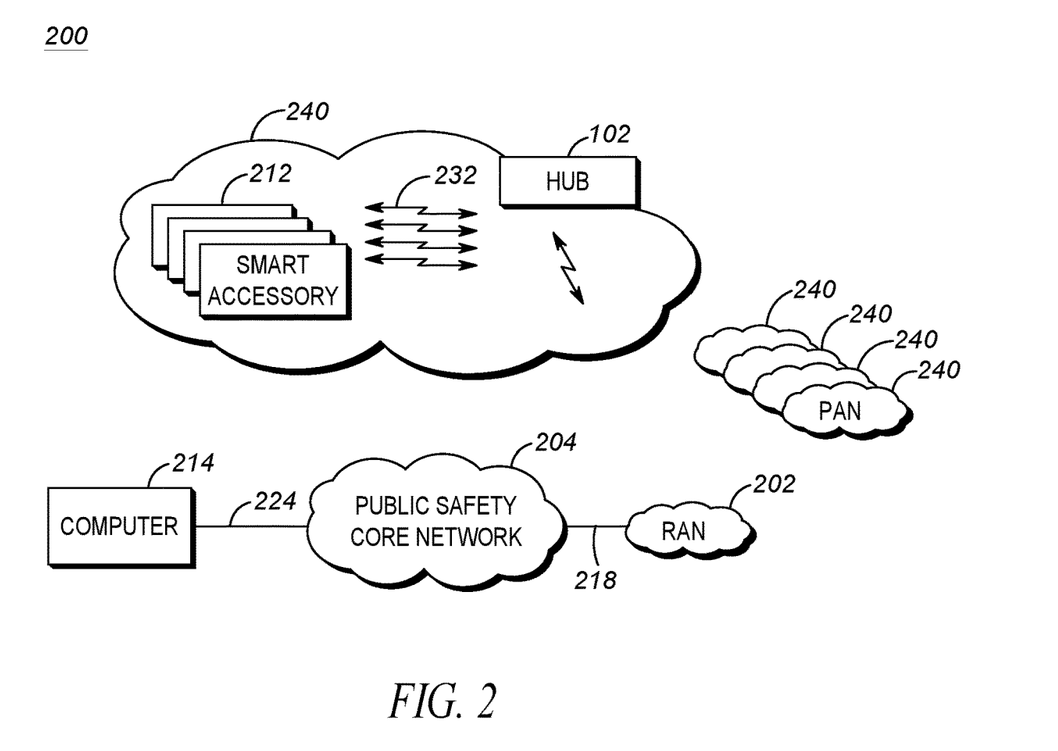
FIG. 2 depicts an example communication system that incorporates a personal-area network and a digital assistant.

FIG. 2 depicts an example communication system 200 that incorporates PANs created as described above. System 200 includes one or more radio access networks (RANs) 202, a public-safety core network 204, hub (PAN main device) 102, local devices (subordinate devices that serve as smart accessories/sensors) 212, computer 214, and communication links 218, 224, and 232. In a preferred embodiment of the present invention, hub 102 and devices 212 form PAN 240, with communication links 232 between devices 212 and hub 102 taking place utilizing a short-range communication system protocol such as a Bluetooth communication system protocol. Each officer will have an associated PAN 240. Thus, FIG. 2 illustrates multiple PANs 240 associated with multiple officers.

RAN 202 includes typical RAN elements such as base stations, base station controllers (BSCs), routers, switches, and the like, arranged, connected, and programmed to provide wireless service to user equipment (e.g., hub 102, and the like) in a manner known to those of skill in the relevant art. RAN 202 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 202 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 202 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 204 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 204 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between hub 102 and other devices via wireless transmissions in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Hub 102 serves as a PAN main device, and may be any suitable computing and communication device configured to engage in wireless communication with the RAN 202 over the air interface as is known to those in the relevant art. Moreover, one or more hub 102 are further configured to engage in wired and/or wireless communication with one or more local device 212 via the communication link 232. Hub 102 will be configured to determine when to forward information received from PAN devices to, for example, a dispatch center. The information can be forwarded to the dispatch center via RANs 202 based on a user of hub 102 not answering a call.

It should also be noted that any one or more of the communication links 218, 224, could include one or more wireless-communication links and/or one or more wired-communication links.

Devices 212 and hub 102 may comprise any device capable of forming a PAN. For example, devices 212 may comprise a gun-draw sensor, a body temperature sensor, an accelerometer, a heart-rate sensor, a breathing-rate sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a biometric sensor (e.g., wristband), a barometer, speech recognition circuitry, a gunshot detector, . . . , etc. Some examples follow:

A sensor-enabled holster 212 may be provided that maintains and/or provides state information regarding a weapon or other item normally disposed within the user's sensor-enabled holster 212. The sensor-enabled holster 212 may detect a change in state (presence to absence) and/or an action (removal) relative to the weapon normally disposed within the sensor-enabled holster 212. The detected change in state and/or action may be reported to the portable radio 102 via its short-range transceiver. In some embodiments, the sensor-enabled holster may also detect whether the first responder's hand is resting on the weapon even if it has not yet been removed from the holster and provide such information to portable radio 102. Other possibilities exist as well.

A biometric sensor 212 (e.g., a biometric wristband) may be provided for tracking an activity of the user or a health status of the user 101, and may include one or more movement sensors (such as an accelerometer, magnetometer, and/or gyroscope) that may periodically or intermittently provide to the portable radio 102 indications of orientation, direction, steps, acceleration, and/or speed, and indications of health such as one or more of a captured heart rate, a captured breathing rate, and a captured body temperature of the user 101, perhaps accompanying other information.

An accelerometer 212 may be provided to measures acceleration. Single and multi-axis models are available to detect magnitude and direction of the acceleration as a vector quantity, and may be used to sense orientation, acceleration, vibration shock, and falling. The accelerometer 212 may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

A heart rate sensor 212 may be provided and use electrical contacts with the skin to monitor an electrocardiography (EKG) signal of its wearer, or may use infrared light and imaging device to optically detect a pulse rate of its wearer, among other possibilities.

A breathing rate sensor 212 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

Computer 214 comprises, or is part of, a computer-aided-dispatch center (sometimes referred to as an emergency-call center or public-safety answering point), that may be manned by an operator providing necessary dispatch operations. For example, computer 214 typically comprises a graphical user interface that provides the dispatch operator necessary information about public-safety officers. As discussed above, some of this information originates from devices 212 providing information to hub 102, which forwards the information to RAN 202 and ultimately to computer 214.

Hub 102 comprises a digital assistant (not shown in FIG. 2). The digital assistant (sometimes referred to as a virtual partner) will reactively provide officer-requested information, or may provide information automatically based one or more sensor status or triggers in which the digital assistant may proactively provide such valuable information to the user absent any explicit request from the user (e.g., "You have received a call from dispatch").

Expanding on the above, each user of the system may possess a hub 102 comprising a digital assistant and many associated devices forming a PAN. For each user of the system, hub 102 may track the user's current associated PAN devices (sensors 212) along with sensor data for that user. This information may be used to compile a summary for each user (e.g., equipment on hand for each user, along with state information for the equipment). This information may be used by any digital assistant to provide valuable content to the user and to others. As discussed, the content may be provided spontaneously, in response to a trigger, or in response to a query. In a preferred embodiment of the present invention, the content is provided when a call remains unanswered by the user of a hub 102.

With the above in mind, hub 102 is also configured with a natural language processing (NLP) engine configured to determine the intent and/or content of the any over-the-air voice transmissions received by others. The NLP engine may also analyze oral queries and/or statements received by any user and provide responses to the oral queries and/or take other actions in response to the oral statements. It should be noted that any over-the-air communication between users (e.g., on the talkgroup) will be monitored by the NLP engine in order to determine the content of the over-the-air voice transmission.

Figure 3:
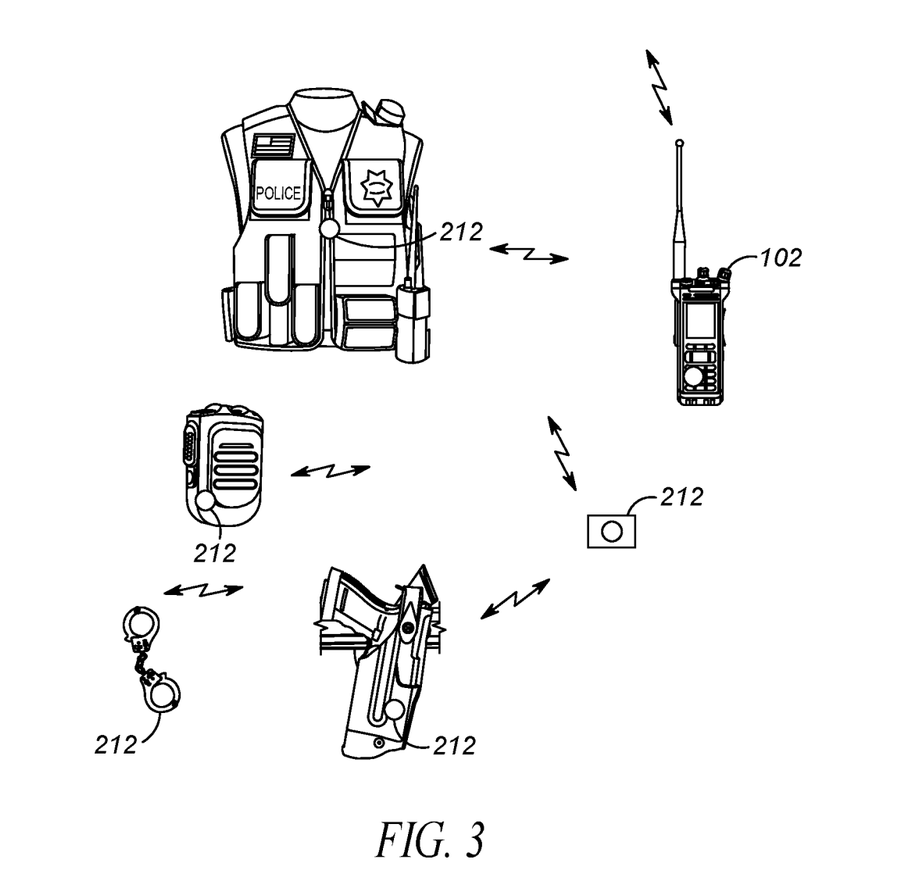
FIG. 3 is a more-detailed view of a personal-area network of FIG. 2.

FIG. 3 depicts another view of a personal-area network 240 of FIG. 2. Personal-area network comprises a very local-area network that has a range of, for example 10 feet. As shown in FIG. 3, various devices 212 are that attach to clothing utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, and a camera 212 is provided.

Devices 212 and hub 102 form a PAN 240. PAN 240 preferably comprises a Bluetooth PAN. Devices 212 and hub 102 are considered Bluetooth devices in that they operate using a Bluetooth, a short range wireless communications technology at the 2.4 GHz band, commercially available from the "Bluetooth special interest group". Devices 212 and hub 102 are connected via Bluetooth technology in an ad hoc fashion forming a PAN. Hub 102 serves as a main device while devices 212 serve as subordinate devices.

Hub 102 provides information to the officer, and/or forwards local status alert messages describing each sensor state/trigger event over a network (e.g., RAN/Core Network) to computer 214 and other devices 102. In alternate embodiments of the present invention, hub 102 may forward the local status alerts/updates for each sensor to mobile and non-mobile peers (shift supervisor, peers in the field, etc), or to the public via social media. RAN core network preferably comprises a network that utilizes a public-safety over-the-air protocol. Thus, hub 102 receives sensor information via a first network (e.g., Bluetooth PAN network), and forwards the information to computer 214 (or others) via a second network (e.g., a public safety wide area network (WAN)).

As described above, hub 102 will modify one of its wake words to coincide with a current user's call sign. More particularly, as described in U.S. Pat. No. 9,137,645 APPARATUS AND METHOD FOR DYNAMIC CALL BASED USER ID, and incorporated by reference herein, hubs 102 may be shared among users. Thus, Officer Fred may user a hub 102 during his shift, while Officer Jane may use the same hub 102 during a later shift. Since Officer Fred and Officer Jane may utilize differing call signs, hub 102 will be configured to identify its call sign as described in the '645 patent. Once identified, hub 102 will configure its digital assistant to wake upon the current call sign being received via an over-the-air transmission. In other words, the current call sign used by the operator of the radio will be used as a wake word for the radio. This allows radio 102 to be configured to "wake up" upon detection of a user's call sign.

Expanding on the above, utilizing wakeup "sounds" called wake words, in low-power modes of operation are commonly known in the area of personal digital assistants. Many virtual assistant systems perform continuous recognition that targets some particular wakeup phrase. This process is known as phrase spotting. Typically, a low-power, low complexity phrase spotting technique is utilized to detect a particular phrase. The low complexity phrase spotting is required to prevent high power consumption and to not behave intrusively by responding to utterances not intended for it.

Various commercial implementations detect the phrases, "Hey, Siri", "OK, Google", and "Alexa". Various chip and software vendors, provide devices and algorithms optimized for phrase spotting. When the system recognizes a wakeup phrase, the system switches to a more computationally-intensive high-power mode, recognizing a much larger vocabulary to process more sophisticated utterances. The more-computationally-intensive mode processes speech until it detects an end-of-utterance condition, at which point it reverts to the low-power phrase-spotting state, typically after a short refractory period.

In the preferred embodiment of the present invention, upon detection of an over-the-air call sign used as a wake word, hub 102 will wake, and may switch to a more computationally-intensive high-power mode, recognizing if the user of hub 102 responds to the radio call.

If the user of hub 102 fails to respond to the call within a predetermined period of time (e.g., 10 seconds), then two things will occur. First, hub 102 will provide current sensor 212 data to the caller, and second, the digital assistant will periodically (e.g., every 10 seconds) remind the user of hub 102 that they have not responded to the call.

As an example of the above, assume that Officer Fred is utilizing a radio previously used on a prior shift by Officer Jane. When powered on, Officer Fred's radio will train itself to identify Officer Fred's call sign (as described in the '645 patent), and configure the radio to use Officer Fred's call sign as a wake word, by for example, storing the wake word in memory. At a later time, Officer Fred finds himself in a noisy environment and did not hear a call put out by, for example, a dispatch operator to Officer Fred. (The dispatch operator may have stated "Dispatch to Sam 6"). Officer Fred's radio will wake upon detection of his call sign (Sam 6) and begin a timer. If the timer expires without Officer Fred responding to his call sign, Officer Fred's radio will transmit sensor data to the caller (in this case the dispatch operator) and the radio's digital assistant will periodically remind Officer Fred that he has an unanswered call from dispatch.

It should be noted that device 102 may determine that Officer Fred has not answered the call by "listening" for any response from Officer Fred via NLP processing. Alternatively, device 102 may simply determine that the push-to-talk (PTT) button has not been pressed on device 102.

Figure 4:
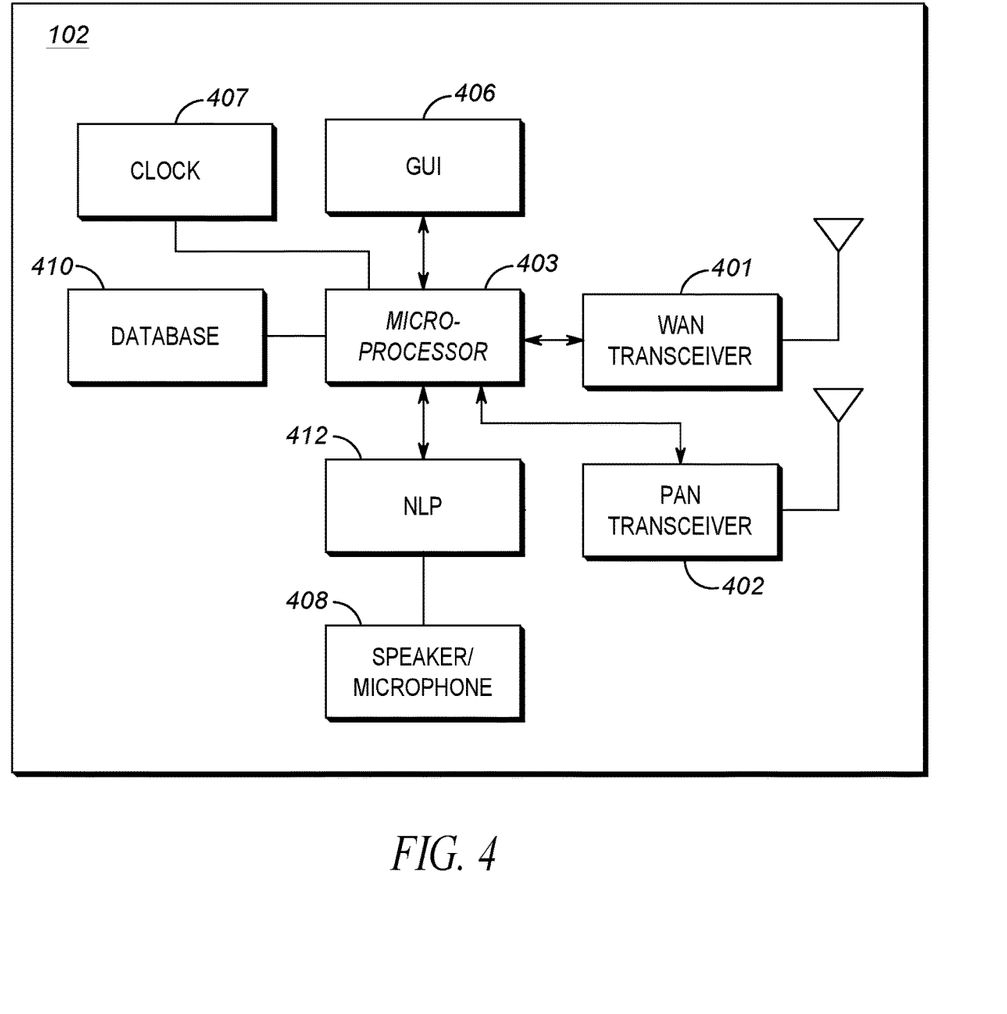
FIG. 4 is a block diagram of a hub.

With the above in mind, FIG. 4 sets forth a schematic diagram that illustrates a radio 102 that can be configured to change its wake word to a current user's call sign, detect that the radio has received a call that has not been answered, provide sensor data to the caller, and periodically remind the operator of the radio that they have a missed call. In an embodiment, the device is embodied within hub 102, however in alternate embodiments the device may be embodied within the public-safety core network 204, or more computing devices in a cloud compute cluster (not shown), or some other communication device not illustrated in FIG. 2, and/or may be a distributed communication device across two or more entities.

As shown, radio 102 includes a wide-area-network (WAN) transceiver 401 (e.g., a transceiver that utilizes a public-safety communication-system protocol), a Personal-Area Network (PAN) transceiver 402, Natural Language Processor (NLP) 412, logic circuitry 403 (which may serve as a digital assistant), Graphical User Interface (GUI) 406, speaker/microphone 408, and database 410. In other implementations, radio 102 may include more, fewer, or different components. Regardless, all components are connected via common data busses as known in the art.

WAN transceiver 401 may comprise well known long-range transceivers that utilize any number of network system protocols. (As one of ordinary skill in the art will recognize, a transceiver comprises both a transmitter and a receiver for transmitting and receiving data). For example, WAN transceiver 401 may be configured to utilize a next-generation cellular communications protocol operated by a cellular service provider, or any public-safety protocol such as an APCO 25 network or the FirstNet broadband network. WAN transceiver 401 receives communications from users, as well as sensor data from users. It should be noted that WAN transceiver 401 is shown as part of radio 102, however, WAN transceiver 401 may be located in RAN 202 (e.g., a base station of RAN 202), with a direct link to radio 102.

PAN transceiver 402 may be well known short-range (e.g., 30 feet of range) transceivers that utilize any number of network system protocols. For example, PAN transceiver 402 may be configured to utilize Bluetooth communication system protocol for a body-area network, or a private 802.11 network. PAN transceiver forms the PAN (acting as a main device) with various sensors 212.

GUI 406 comprises provides a way of displaying information and receiving an input from a user. For example, GUI 406 may provide a way of conveying (e.g., displaying) information to a user regarding that status of devices 212.

Clock 407 comprises a standard electronic clock that is utilized by logic circuitry 403 to determine an amount of time that has passed from receiving a user's call sign. Logic circuitry 403 comprises a digital signal processor (DSP), general purpose microprocessor, a programmable logic device, or application specific integrated circuit (ASIC) and is configured (along with NLP 412) to serve as a digital assistant/digital assistant a users of the system. In addition to functioning as a digital assistant, logic circuitry 403 will also configure device 102 to change a wake word to a current call sign being utilized by the user of device 102. Logic circuitry 403 (or a similar low-power logic circuit) will wake upon the wake word being detected by WAN transceiver 401 and determine that no response has been provided. When no response is provided, logic circuitry 403 will access database 410 and provide sensor information to the calling party. The sensor information may be provided by establishing a data connection between device 102 and the calling party. The sensor information may be provided over the data channel. (It should be noted that any updates to sensor information are received via PAN transceiver 402, passed to logic circuitry 403, and stored in database 410).

Logic circuitry 403 will also periodically remind the user of device 102 that they have not answered a call placed to them. This reminder can be part of a digital assistant verbal transmission by utilizing NLP 412 and speaker 408.

NLP 412 may be a well known circuitry to analyze, understand, and derive meaning from human language in a smart and useful way. By utilizing NLP, automatic summarization, translation, named entity recognition, relationship extraction, sentiment analysis, speech recognition, text-to-speech conversion, sending verbal reminders, and topic segmentation can take place.

Speaker/microphone 408 provides a mechanism for receiving human voice and providing it to the digital assistant (e.g., logic circuitry 403/NLP 412), along with providing audible information generated by the digital assistant (e.g., a voice). Speaker/microphone 408 may receive queries from a user and provide the queries to logic circuitry 403, acting as a digital assistant.

As provided, FIG. 4 shows an apparatus 102 comprising logic circuitry configured to determine that a wake word has been received by an over-the-air transmission from a caller, wherein the wake word comprises a call sign, determine that a user has not responded to the over-the-air transmission comprising the wake word, and provide sensor data to the caller in response to the determination that the user has not responded to the over-the-air transmission.

As discussed, a digital assistant is provided (logic circuitry/NLP) that is configured to periodically remind the user that the user has not responded to the call. Additionally, the wake word preferably comprises a call sign that is a combination of identifying letters, letters and numbers, or words assigned to the user for use in communication.

Figure 5:
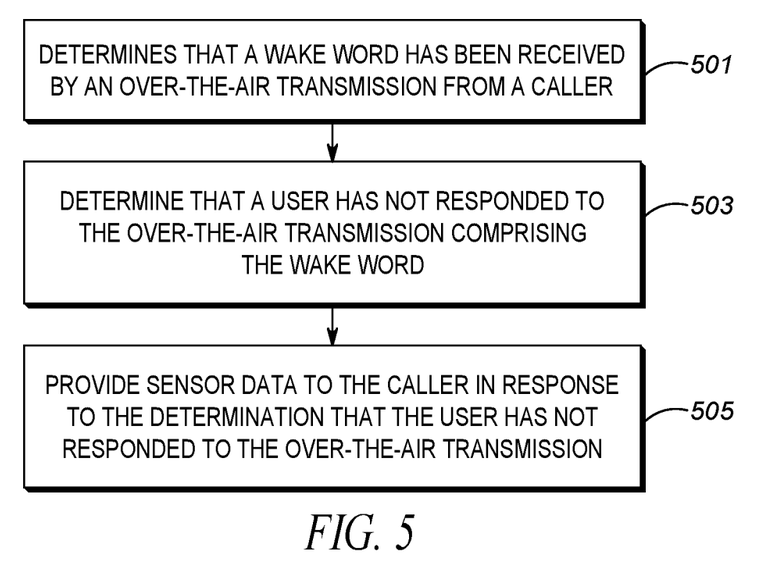
FIG. 5 is a flow chart showing operation of the hub of FIG. 4.

FIG. 5 is a flow chart showing operation of hub 102. The logic flow begins at step 501 where a digital assistant (logic circuitry 403/NLP 412) determines that a wake word has been received by an over-the-air transmission from a caller, wherein the wake word comprises a call sign. At step 503, logic circuitry utilizes clock 407 to determine that a user has not responded to the over-the-air transmission comprising the wake word. Finally, at step 505, logic circuitry utilizes WAN transmitter 401 to provide sensor data to the caller in response to the determination that the user has not responded to the over-the-air transmission.

As discussed above, a digital assistant will periodically remind the user that the user has not responded to the call if they have not responded to the call within a predetermined period of time. Additionally, the wake word comprises a call sign that is a combination of identifying letters, letters and numbers, or words assigned to the user for use in communication. Finally, the sensor data comprises data from a body-worn sensor that is part of a personal-area network (PAN).

As discussed above, a current call sign for a user may be learned by logic circuitry 403 and assigned to the wake word of the device.

Figure 6:
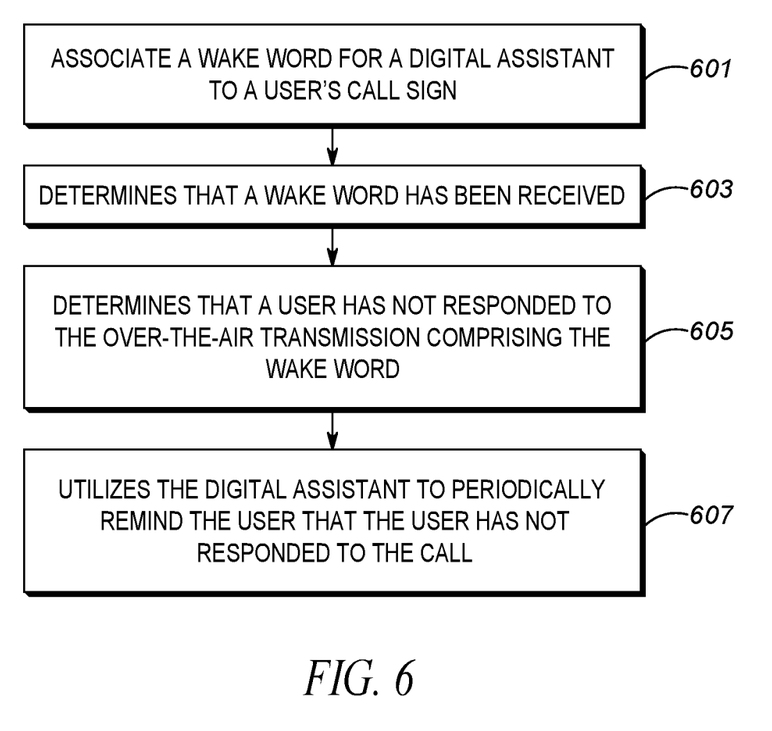
FIG. 6 is a flow chart showing operation of the hub of FIG. 4.

FIG. 6 is a flow chart showing operation of hub 102. The logic flow begins at step 601 where logic circuitry 403 associates a wake word for a digital assistant to a user's call sign so that a digital assistant will wake upon receiving the call sign. At step 603, a digital assistant (logic circuitry/NLP) determines that a wake word has been received by an over-the-air transmission to WAN transceiver 401 from a caller, wherein the wake word comprises the call sign. At step 605 logic circuitry 403 determines that a user has not responded to the over-the-air transmission comprising the wake word and utilizes the digital assistant to periodically remind the user that the user has not responded to the call (step 607).

As discussed above, sensor data may be provided to the caller in response to the determination that the user has not responded to the over-the-air transmission. Additionally, the sensor data may comprise data from a body-worn sensor that is part of a PAN.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising the steps of:
receiving sensor information by a hub of a personal-area network (PAN), wherein the sensor information is received via the PAN from devices that determine various physical and environmental conditions surrounding a public-safety officer and the devices provide the sensor information to the hub of the PAN, and wherein the hub of the PAN serves as a main PAN device while devices serve as subordinate PAN devices;
forwarding the sensor information by the hub of the PAN, wherein the sensor information is forwarded via a second network;
determining by the hub of the PAN that a wake word has been received by an over-the-air transmission from a caller on the second network, wherein the wake word comprises a call sign;
determining by the hub of the PAN that a user has not responded to the over-the-air transmission on the second network comprising the wake word;
providing by the hub of the PAN, the sensor information received on the PAN to the caller, via the second network, in response to the determination that the user has not responded to the over-the-air transmission.

2. The method of claim 1 further comprising the step of:
utilizing a digital assistant to periodically remind the user that the user has not responded to the call.

3. The method of claim 1 wherein the wake word comprises a call sign that is a combination of identifying letters, letters and numbers, or words assigned to the user for use in communication.

4. The method of claim 1 wherein the sensor information comprises data from a body-worn sensor.

5. The method of claim 1 further comprising the steps of:
learning a current call sign for a user; and
assigning the wake word to the current call sign for the user.

6. A hub of a Personal-Area Network (PAN) comprising:
logic circuitry configured to:
receive sensor information from devices within the PAN via the PAN, wherein the devices within the PAN determine various physical and environmental conditions surrounding a public-safety officer and the various devices provide the sensor information to the hub of the PAN, and wherein the hub of the PAN serves as a main PAN device while devices serve as subordinate PAN devices;
determine that a wake word has been received by an over-the-air transmission on a second network from a caller, wherein the wake word comprises a call sign;
determine that a user has not responded to the over-the-air transmission on the second network;
provide the sensor information received on the PAN to the caller, via the second network, in response to the determination that the user has not responded to the over-the-air transmission.

7. The apparatus of claim 6 further comprising:
a digital assistant configured to periodically remind the user that the user has not responded to the call.

8. The apparatus of claim 6 wherein the wake word comprises a call sign that is a combination of identifying letters, letters and numbers, or words assigned to the user for use in communication.

9. The apparatus of claim 6 wherein the sensor information comprises data from a body-worn sensor.

* * * * *